United States Patent
Gefflaut et al.

(10) Patent No.: US 10,102,377 B2
(45) Date of Patent: *Oct. 16, 2018

(54) PROTECTION OF SECURED BOOT SECRETS FOR OPERATING SYSTEM REBOOT

(71) Applicant: MICROSOFT TECHNOLOGY LICENSING, LLC, Redmond, WA (US)

(72) Inventors: Alain Gefflaut, Kirkland, WA (US); Andrey Shedel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,906

(22) Filed: Aug. 4, 2017

(65) Prior Publication Data

US 2017/0329971 A1  Nov. 16, 2017

Related U.S. Application Data

(63) Continuation of application No. 15/085,054, filed on Mar. 30, 2016, now Pat. No. 9,779,248.

(51) Int. Cl.
*G06F 21/57* (2013.01)
*G06F 21/44* (2013.01)
*G06F 9/44* (2018.01)
*H04L 9/32* (2006.01)
*G06F 9/4401* (2018.01)
*G06F 21/51* (2013.01)
*G06F 21/60* (2013.01)

(52) U.S. Cl.
CPC ............ *G06F 21/575* (2013.01); *G06F 9/441* (2013.01); *G06F 9/4406* (2013.01); *G06F 21/44* (2013.01); *H04L 9/3234* (2013.01); *G06F 21/51* (2013.01); *G06F 21/60* (2013.01)

(58) Field of Classification Search
CPC ........ G06F 21/575; G06F 21/44; G06F 9/441; G06F 9/4406; H04L 9/3234
See application file for complete search history.

(56) References Cited

U.S. PATENT DOCUMENTS

| 7,073,059 B2 | 7/2006 | Worely et al. |
| 7,313,705 B2 | 12/2007 | Turkboylari |
| 7,437,613 B2 | 10/2008 | Baumberger |

(Continued)

OTHER PUBLICATIONS

"Corrected Notice of Allowance Issued in U.S. Appl. No. 15/085,054", dated Jul. 5, 2017, 2 Pages.

(Continued)

*Primary Examiner* — Stefan Stoynov
(74) *Attorney, Agent, or Firm* — Workman Nydegger

(57) ABSTRACT

Protecting secured boot secrets while starting an operating system. Embodiments include identifying that a second operating system is to be started to replace a first operating system, and loading code of the second operating system in a protected portion of the system memory. The protected portion of the system memory is then unprotected, and processor state is set to initiate execution of the code of the second operating system, while using one or more secured boot secrets that were stored in the protected portion of the system memory by the first operation system to attest a security status of the second operating system. The portion of the system the memory is re-protected, including preventing access to the portion of the system memory by the second operating system.

22 Claims, 4 Drawing Sheets

(56) References Cited

U.S. PATENT DOCUMENTS

| | | | |
|---|---|---|---|
| 7,818,616 | B2 | 10/2010 | Kathail et al. |
| 8,185,783 | B2 | 5/2012 | Lee et al. |
| 8,335,931 | B2 | 12/2012 | Lee et al. |
| 8,353,031 | B1 | 1/2013 | Rajan et al. |
| 8,719,559 | B2 | 5/2014 | Aloni et al. |
| 8,825,993 | B2 | 9/2014 | Aloni et al. |
| 9,104,619 | B2 | 8/2015 | Chin et al. |
| 2006/0085630 | A1 | 4/2006 | Challener et al. |
| 2014/0026124 | A1 | 1/2014 | Gilbert et al. |
| 2014/0157264 | A1 | 6/2014 | Russinovich et al. |
| 2015/0178097 | A1 | 6/2015 | Russinovich |
| 2015/0220729 | A1 | 8/2015 | Rudolph et al. |
| 2016/0092678 | A1 | 3/2016 | Probert et al. |

OTHER PUBLICATIONS

"Notice of Allowance Issued in U.S. Appl. No. 15/085,054", dated May 30, 2017, 9 Pages.

Bovenzi, et al., "Towards fast OS Rejuvenation: An Experimental Evaluation of Fast OS Reboot Techniques", In IEEE 24th International Symposium on Software Reliability Engineering, Nov. 4, 2013, pp. 61-70.

Candea, et al., "Recursive Restartability: Turning the Reboot Sledgehammer into a Scalpel", In Proceedings of the 8th Workshop on Hot Topics in Operating Systems, May 20, 2001, pp. 1-6.

Chen, et al., "Live Updating Operating Systems using Virtualization", In Proceedings of the 2nd International Conference on Virtual Execution Environments, Jun. 14, 2006, pp. 35-44.

Depoutovitch, et al., "Otherworld—Giving Applications a Chance to Survive OS Kernel Crashes", In Proceedings of 13th USENIX Symposium on Networked Systems Design and Implementation, Mar. 7, 2016, 9 Pages.

Gibson, Chris, "AIX Live Update", Retrieved from «https://www.ibm.com/developerworks/community/blogs/cgaix/resource/AIXLiveUpdateblog.pdf?lang=en», Oct. 5, 2015, 19 Pages.

"International Search Report and Written Opinion Issued in PCT Application No. PCT/US2017/024219", dated Jun. 2, 2017, 12 Pages.

PROTECTION OF SECURED BOOT SECRETS FOR OPERATING SYSTEM REBOOT

CROSS-REFERENCE TO RELATED APPLICATIONS

This application is a continuation of U.S. patent Ser. No. 15/085,054, filed Mar. 30, 2016, and titled "PROTECTION OF SECURED BOOT SECRETS FOR OPERATING SYSTEM REBOOT," the entire contents of which are incorporated by reference herein in their entirety.

BACKGROUND

The ability of computer systems to store and process information has transformed the way we live and work. Computer systems are more capable than ever, now commonly store a variety of sensitive data (e.g., financial information, personal documents, photos, passwords and other credentials, etc.) and perform a host of processing tasks utilizing that data. Additionally, most modern computer systems are coupled to one another and to other electronic devices to form both wired and wireless computer networks over which the computer systems and other electronic devices can transfer electronic data. With the amount of sensitive data stored on computer systems, and the increased connectedness of computer systems, there is more motivation than ever for nefarious parties to attempt to breach computer system security. For example, these parties may seek to utilize the sensitive data stored on those systems for their own purposes (e.g., to steal it, to encrypt it and use it as a ransom, etc.), may seek to hijack use of computer system resources, or may attempt to otherwise exploit or deceive users in other ways.

Accordingly, computer system manufacturers and software vendors continually seek new ways to harden computer system security. One such mechanism is Secure Boot. Secure Boot is a security standard developed by members of the computing industry to make sure that a computer system boots using software that is trusted by the computer manufacturer from the time the computer system is powered on to a defined point in an operating system startup. Using Secure Boot, every phase of an operating system boot process is measured and secured using secrets (e.g., encryption keys). For example, when a computer system first starts, its Secure Boot compliant firmware checks the signature of the boot manager that is to be loaded, as well as any firmware drivers that are to be loaded. If these signatures are good, the boot manager loads load an operating system loader of a target operating system (e.g., WINDOWS, Linux, UNIX, etc.) and verifies that it is properly signed too. This process continues with the operating system loader verifying the signature of boot drivers and the operating system kernel itself. An operating system that has booted in accordance with Secure Boot provides guarantees that the system is booted with software components that have been validated. Additionally, it can utilize secrets obtained during the boot process to attest to third party software (e.g., anti-malware software) that it was securely booted, and to provide measurements (e.g., a log of components loaded during the boot) taken during the boot process.

Another mechanism for hardening computer system security is to continually discover and patch security vulnerabilities in software, and to release updated versions of the software. This includes discovering and patching security vulnerabilities in operating systems. While some operating system components (e.g., services, drivers, etc.) can potentially be updated while the operating system is running (e.g., "hot patching" components by updating and restarting only those components), updating other core components, such as the kernel, has historically required a full reboot of the computer system itself. Rebooting a computer system is disruptive to the workload executing on the computer system, which is particularly inconvenient in server environments in which processes running on the computer system provide services to other computer systems.

To address this shortcoming, some operating systems vendors have developed mechanisms for updating core operating system components, such as the kernel, without requiring a full computer system reboot. In some implementations, such as kernel software reboot (KSR) from MICROSOFT CORPORATION, the currently executing operating system loads a new version of one or more operating system components (such as an operating system loader component, a new kernel, boot drivers, etc.) in memory, and directly begins execution of those components, without performing a full system reboot. Such in-place update/restart mechanisms can restart an updated operating system more quickly than doing a full system reboot, which reduces interruptions to workloads executing on the computer system.

However, when an operating system that was started in accordance with Secure Boot is replaced using mechanisms such as KSR, the newly started operating system loses the security assurances provided by Secure Boot. Specifically, there is no way to guarantee that the new operating system running on the system is genuine and has not been compromised. Also secrets that had been retrieved from Secure Boot components during the original hardware boot might have been compromised or leaked. Accordingly, there is an inherent incompatibility between Secure Boot and in-place operating system update mechanisms, which results in system administrators having to choose between use of Secure Boot and use of in-place operating system update mechanisms.

BRIEF SUMMARY

At least some embodiments described herein address the incompatibilities between Secure Boot and in-place operating system update mechanisms. In particular, embodiments include use of a secured memory environment, which includes memory that is inaccessible to the executing operating system, to store one or more secrets obtained during the secured booting process of the operating system and to preserve and guarantee the integrity of a new operating system that will be subsequently loaded. Storing the secrets in a secured memory environment protects the secrets from tampering by untrusted components executing in the operating system. When another operating system is started using an in-place operating system update mechanism, the replacement operating system can utilize these stored secrets as part of attesting to its integrity, such as to attest to third party software that it was securely booted, and to provide measurements taken during the boot process.

For example, embodiments may include methods, systems, and computer program products for protecting secured boot secrets while starting an operating system. Embodiments include identifying that a second operating system is to be started to replace a first operating system that is already running at the computer system, without performing a full reboot of the computer system. Based on identifying that the second operating system is to be started to replace the first operating system, a computer system loads code of the second operating system in a protected portion of the system memory for starting the second operating system, unprotects the portion of the system memory, and sets a state of one or more processors to initiate execution of the code of the second operating system to start the second operating system. The second operating system uses one or more secured boot secrets that were stored in the portion of the system memory by the first operation system to attest a security status of the second operating system. Embodiments also include re-protecting the portion of the system the memory, including preventing access to the portion of the system memory by the second operating system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein address the incompatibilities between Secure Boot and in-place operating system update mechanisms. In particular, embodiments include use of a secured memory environment, which includes memory that is inaccessible to the executing operating system, to store one or more secrets obtained during the secured booting process of the operating system and to preserve and guarantee the integrity of a new operating system that will be subsequently loaded. Storing the secrets in a secured memory environment protects the secrets from tampering by untrusted components executing in the operating system. When another operating system is started using an in-place operating system update mechanism, the replacement operating system can utilize these stored secrets as part of attesting to its integrity, such as to attest to third party software that it was securely booted, and to provide measurements taken during the boot process.

Figure 1:
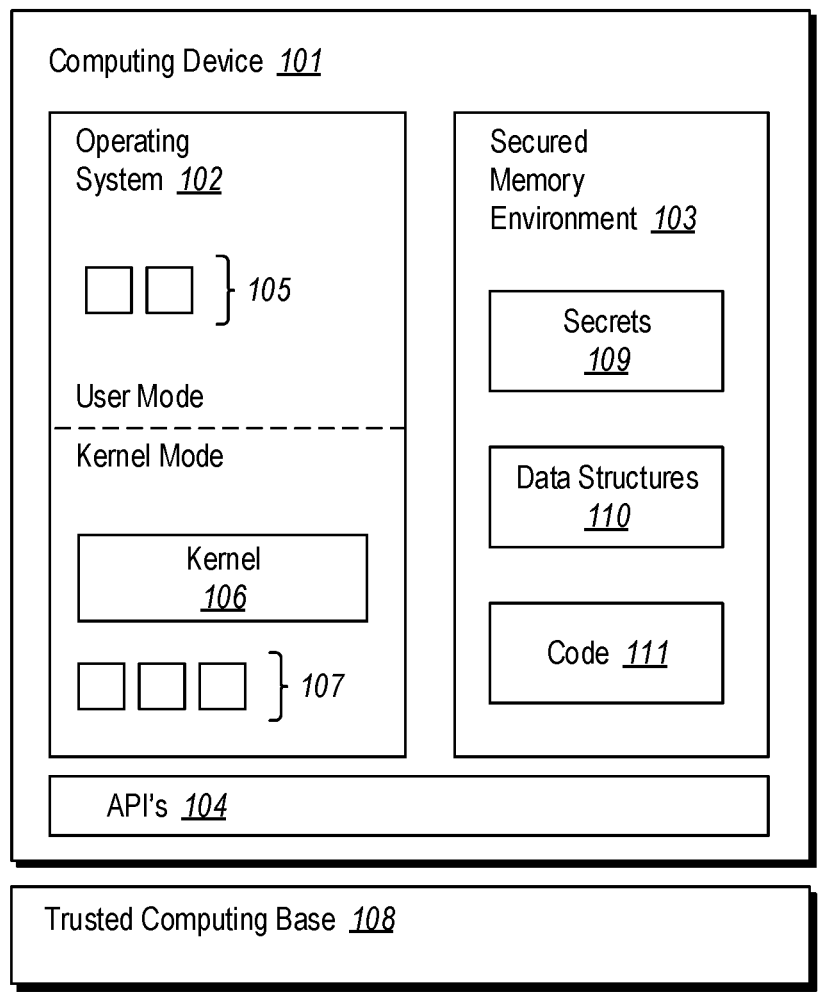
FIG. 1 illustrates a first embodiment of a computing environment for protecting secured boot secrets while starting an operating system.

For example, FIG. 1 illustrates an example computing environment 100 for protecting secured boot secrets while starting an operating system. In particular, FIG. 1 illustrates that a computing device 101 can execute an operating system 102 in a first portion of memory, and can contain a second portion of memory protected within a secured memory environment 103 (i.e., isolated from the operating system 102). In some embodiments, the operating system 102 and the secured memory environment 103 are both in system memory (e.g. random access memory (RAM)) that been partitioned such that the operating system 102 lacks direct access to memory of the secured memory environment 103. For example, FIG. 1 illustrates that the computing device 101 can include application programming interfaces (APIs) 104 that can provide a buffer between memory of the operating system 102 and memory of the secured memory environment 103, but which can enable communication of data between the two in a controlled manner.

In other embodiments, the operating system 102 and the secured memory environment 103 are in different memories altogether. For example, the operating system 102 may execute in system memory, while the secured memory environment 103 comprises a separate memory component. In this situation, the APIs may be APIs provided by that memory component or related hardware/firmware.

FIG. 1 also illustrates that the operating system includes a user mode in which user mode processes 105 execute, and a kernel mode in which a kernel 106 and kernel mode processes and drivers 107 execute. FIG. 1 also illustrates that the computing device 101 boots utilizing a trusted computing base (TCB) 108, which includes a set of hardware, software, and procedural components that enforce one or more security policies during system startup. During boot, and while utilizing the TCB 108, the operating system 102 can obtain various forms of secured boot secrets, such as encryption keys and measurements (e.g., loaded drivers, timing data, etc.), using the TCB 108. The operating system 102 can use these encryption keys and realize and store measurements to verify its own integrity, to assert to its security status, and to provide measurements to third party software.

FIG. 1 illustrates that these secrets 109 can be stored in the secured memory environment 103. These may be stored by the operating system 101 utilizing the APIs 104, by the TCB 108, or by other components such as a hypervisor, as discussed later. Storing the secrets 109 in the secured memory environment protects them from tampering by processes executing at the operating system 102 (including user mode processes 105 and code executing in kernel mode such as kernel mode processes and drivers 107). Thus, for example, if the operating system 102 were to be compromised by a malicious process 105 or driver 107, the secured memory environment 103 and the APIs 104 prevent that malicious process 105 or driver 107 from accessing/tampering with the secrets 109 or the secured code 111.

When the operating system 102 needs to be updated or otherwise restarted, the computing device 101 enters a first phase in which it sets up memory data structures 110 and code 111 associated with starting the replacement operating system in the secured memory environment 103. For example, the operating system 102 may utilize the APIs 104 to place an operating system loader and/or kernel (e.g., code 111) of the replacement operating system, and other memory data structures 110 such as memory page mappings in the secured memory environment 103. Then, protections of the secured memory environment 103 are lowered, and in a second phase the code 111 is initiated to start the replacement operating system's loader. In doing so, the replacement operating system leverages the secrets 109 to initiate its boot using encryption keys, measurements, etc. that were obtained from the TCB 108 during the initial boot of the computing device 101. Accordingly, the replacement operating system can provide the same types of security assurances and measurements as the original operating system 102.

Figure 2A:
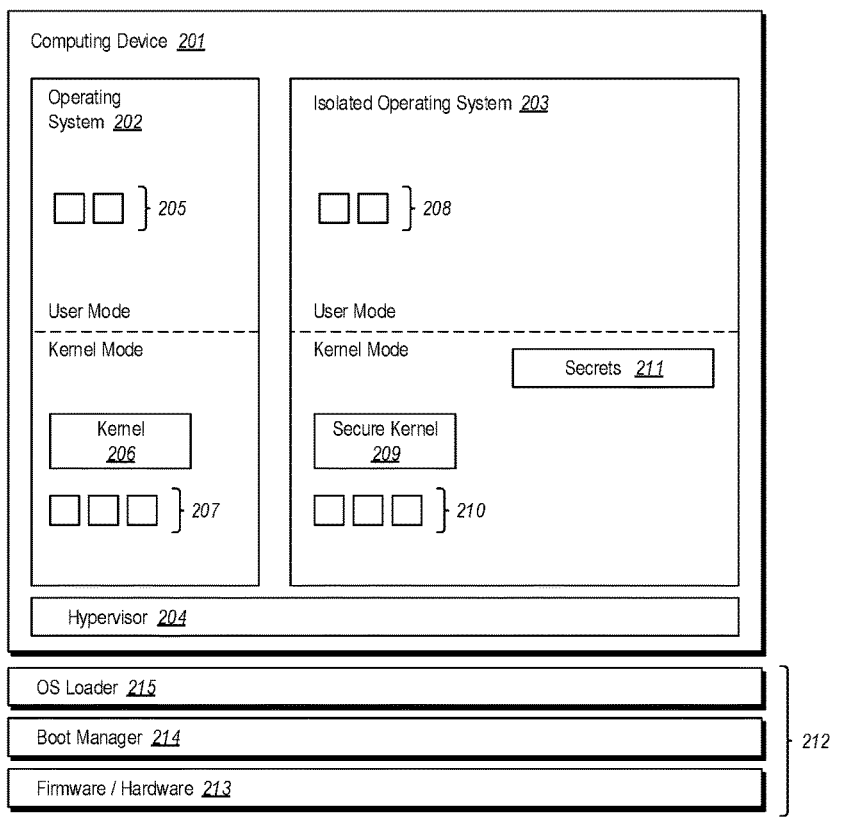
FIG. 2A illustrates a second embodiment of a computing environment for protecting secured boot secrets while starting an operating system.
Figure 2B:
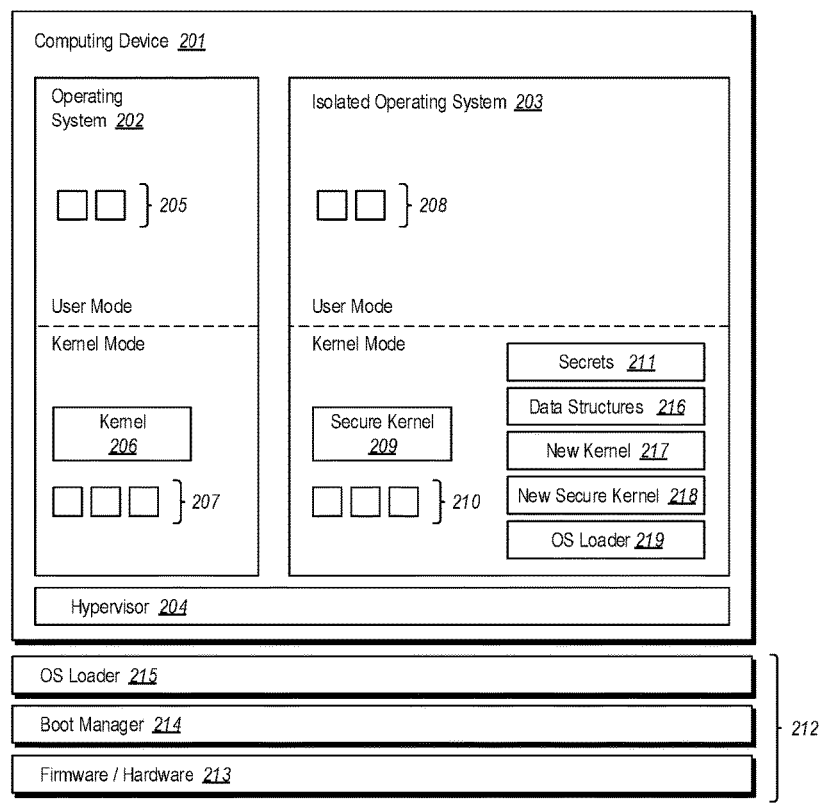
FIG. 2B further illustrates the second embodiment of a computing environment for protecting secured boot secrets while starting an operating system.

FIGS. 2A and 2B illustrate a more particular example. FIG. 2A illustrates that a computing device 201 can execute an operating system 202 (e.g., the operating system 102 of FIG. 1) in a first portion of memory, and can execute an isolated operating system 203 in a second portion of memory. Like operating system 102, operating system 202 can include a user mode and kernel mode, with user mode processes 105, a kernel 206, and kernel mode processes and drivers 107. The isolated operating system 203 can execute in a virtual partition, such as one supported by virtualization technology such as second level address translation, including use of a hypervisor 204 (e.g., HYPER-V, XEN, VMWARE, etc.). For example, the hypervisor 204 can partition system memory by allocating a portion of system memory to the operating system 102, and by allocating a different portion of system memory to the secured memory environment 103.

The isolated operating system 203 can also include its own user mode processes, a secure kernel 209, and kernel mode processes and drivers 210. The isolated operating system 203 executing in the virtual partition can correspond to the secured memory environment 103 of FIG. 1. As such, the memory of the isolated operating system 203 can be inaccessible to the operating system 202, except as permitted by APIs, such as APIs provided by the hypervisor 204.

In some embodiments, the isolated operating system 203 is based on, or a derivative of, the operating system 202. For example, the secure kernel 209 may comprise as subset of functionality of the kernel 206, and the isolated operating system 203 may serve as an isolated environment to securely support processes executing in the operating system 202. For example, the secure kernel 209 may provide an interface similar to the kernel 206, but support a subset of the API provided by the kernel 206. An example of such a configuration is virtualization-based security (VBS) from MICROSOFT CORPORATION.

Like the secured memory environment 103, the isolated operating system 203 can store secrets 211, such as encryption keys and measurements obtained from a trusted computing base 212 during initial cold booting of the operating system 202 and/or the isolated operating system 203. While these secrets are depicted as being stored in kernel mode memory, some embodiments may store them in user mode memory.

FIG. 2A also illustrates an example of a TCB 212 that supports booting of the operating system 202 and the isolated operating system 203. For example, the TCB 212 may operate in accordance with Secure Boot standards. In particular, the TCB 212 includes computing device firmware/hardware 213, a boot manager 214, and an operating system loader 215. When the computing device 201 powers up, it directs execution to the firmware/hardware 213. The firmware/hardware 213 checks a signature of the boot manager 214, as well as any firmware drivers that are to be loaded. If those checks pass, execution is given to the boot manager 214 (along with loading any appropriate firmware drivers). The boot manager 214 checks a signature of the OS loader 215 (which is typically a component of the operating system 202), and passes execution to the OS loader 215 if the signature check passes. The OS loader then initiates loading of the hypervisor 2014, operating system 202, and isolated operating system 203.

As part of its operation, the OS loader receives secrets from lower-level components in the TCB 212 (i.e., the boot manager 214 and/or the firmware/hardware 213). For example, the OS loader may receive secrets from hardware such as a trusted platform module (TPM), for from firmware such as UEFI. The secrets 211 may comprise these secrets, potentially among others that are generated later in the operating system startup process.

FIG. 2B illustrates an embodiment of use of the secured boot secrets that are protected within the environment 200 of FIG. 2A. As illustrated in FIG. 2B, when it is detected that another (e.g., replacement or new/updated) operating is to be started, the computing device 201 sets up memory data structures and code in memory of the isolated operating system 203. For example, the memory data structures 216 may include memory page mappings that are used by the new operating system during the restart, and code may include code of the other operating system, such as the depicted new kernel 217 (e.g., a new or replacement version of the kernel 206) and/or the depicted OS loader 219 (e.g., corresponding to or a new version of the OS loader 215). Other data structures/code may include the depicted new secure kernel 218 (e.g., a new or replacement version of the secure kernel 209), a new hypervisor (e.g., a new or replacement version of the hypervisor 204), new or replacement drivers, etc. While these memory data structures/code are depicted as being stored in kernel mode memory of the isolated operating system 203, some embodiments may store one or more of them in user mode memory. These memory data structures/code may be set up by the operating system 202 (e.g., through the hypervisor 204) and/or by the isolated operating system 203.

Once the memory data structures/code are set up in memory of the isolated operating system 203, an operating system restart is initiated. In some embodiments, this may include ceasing execution of certain components, such as the kernel 206, the secure kernel 209, and/or the hypervisor 204, and/or unloading them from memory. It will be appreciated that ceasing execution of and/or unloading some of these components (e.g., the hypervisor) may have the effect of un-protecting the memory devoted to the isolated operating system 203. As such, certain measures can be taken to mitigate attacks on the secrets 211 and or the data structures/code (e.g., by rogue drivers or other processes executing in the operating system 202) while the memory is unprotected, such as disabling direct memory accesses (DMA) and/or disabling processor interrupt requests (IRQs).

Initiating the operating system restart includes causing a processor of the computing device 201 to begin execution of code stored at the memory location corresponding to the OS loader 219. The may include setting processor state (e.g., the program counter), so that the processor begin execution of the code 111. Effectively, this starts operating system boot at the OS loader phase (i.e., when the prior OS loader 215 was executed) of the TCB 212. As part of this startup, the new OS loader 219 can utilize the secrets 211 to resume a secure and measured boot of the new hypervisor, the new kernel 217, and/or the new secure kernel 209. As such, when the new operating system is started, it can provide the same types of security assurances and measurements as the original operating system. When the new operating system has started, the computing device 201 returns to a state similar that of FIG. 2A in which at least the operating system 202 is now the new/updated operating system.

Returning to the memory data structures 110/216, it has been noted that these may include memory tables/mappings that are used by the new operating system during its startup process. These tables/mappings may store which memory pages belong to certain applications (executing in the operating system 202 and/or in the isolated operating system 203), which memory pages belong to databases, which memory pages belong to the operating system 202 and which memory pages belong to the isolated operating system 203, etc. These may also comprise flags designating memory pages that belong to operating system 202, and pages belonging to isolated operating system 203. As such, certain state can be preserved in memory during the operating system restart.

For example, if the operating system 202 is host to virtual machines, the data structures 110/216 may store tables/mappings to which memory pages belong to those virtual machines. In another example, if the operating system 202 is running a database server, the data structures 110/216 may store which memory pages belong to the database. Then, when the OS loader 219 starts the new operating system, that memory can be preserved, and those memory pages can be used to resume the virtual machine and/or database processes to their prior state. As such the restart can occur without flushing that data to durable storage prior to the restart, and reloading that data from the durable storage after the restart. Such state can be preserved for virtually any type of process executing at the computing device (including processes 205 and processes 208).

Figure 3:
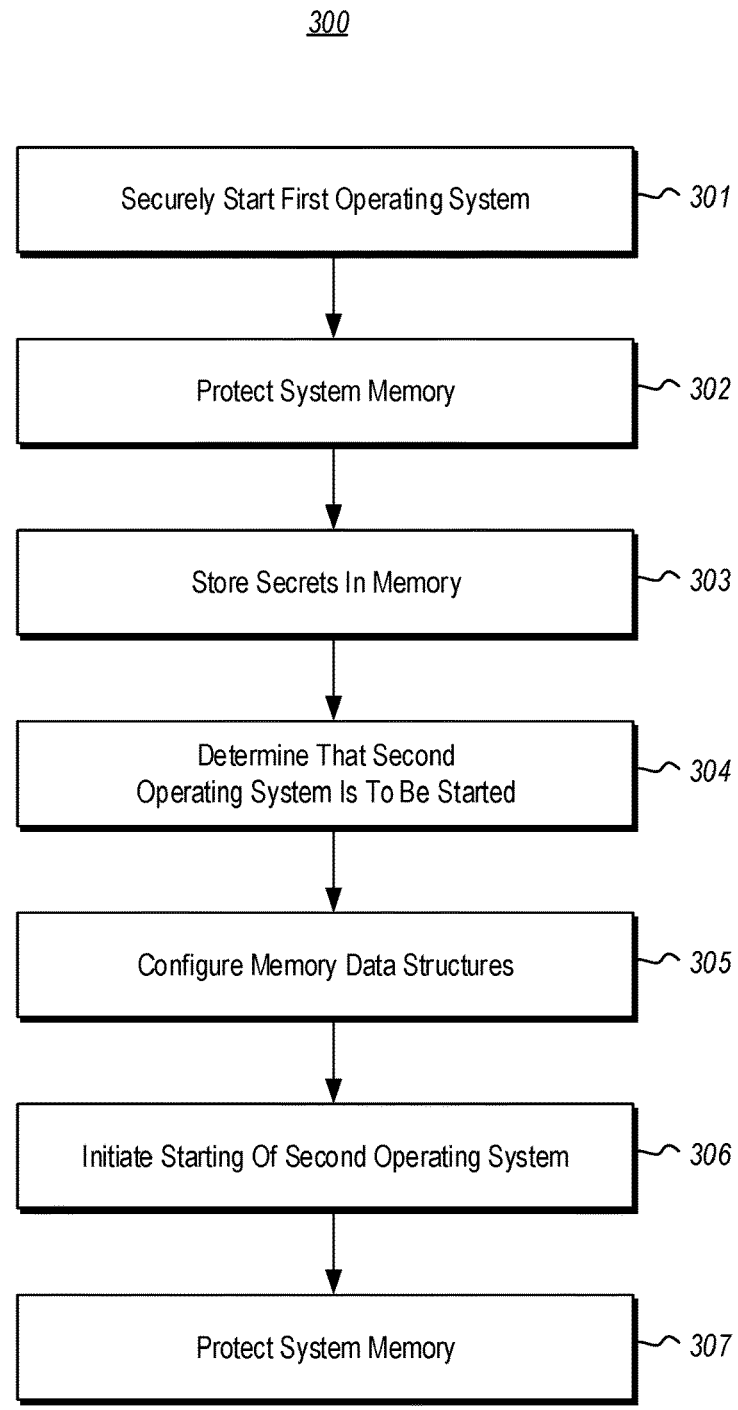
FIG. 3 illustrates a flowchart of an example method for protecting secured boot secrets while starting an operating system.

In view of the foregoing, FIG. 3 illustrates a flow chart of an example method 300 for protecting secured boot secrets while starting an operating system. Method 300 will be described with respect to FIGS. 1, 2A, and 2B.

Method 300 comprises an act of 301 of securely starting a first operating system. Act 301 can include starting a first operating system in reliance on a TCB, including obtaining one or more secured boot secrets from the TCB that are usable for attesting a security status of the first operating system. For example, in reference to FIG. 1, computing device 101 can start operating system 102 using the TCB 108. During boot, the operating system 102 can obtain secrets, such as encryption keys and measurements, from the TCB 108. In a more detailed embodiment, FIG. 2A depicts that computing device 201 can start the operating system 202, beginning with firmware/hardware 213 that executes a boot manager 214 after verifying its signature, which then starts an OS loader 215 of the operating system 202 after verifying its signature. The OS loader 215 can obtain secrets from lower-level TCB 212 components, and additional secrets can be generated during subsequent booting of the operating system 202.

Method 300 comprises an act of 302 of protecting system memory. Act 302 can include protecting a portion of the system memory, including preventing access to the portion of the system memory by the first operating system. For example, FIG. 1 illustrates that computing device 101 can include a secured memory environment 103. This secured memory may be a protected/isolated portion of system memory, or may be part of some other memory component. In the example of FIG. 2A, the secured memory environment comprises an isolated operating system 203 that runs within virtual memory partition created by a hypervisor 204.

Method 300 comprises an act of 303 of storing secrets in memory. Act 303 can include storing the one or more secured boot secrets in the protected portion of the system memory. For example, in FIG. 1 secrets 109 are stored in the secured memory environment 103. In FIG. 2A secrets 211 are stored in memory allocated to the isolated operating system 203. These secrets may be stored by the operating system 102/202 (e.g., using the APIs 104 or the hypervisor 204), or by other components such as the OS loader 215, the hypervisor 204, or the secure kernel 209.

Method 300 comprises an act of 304 of determining that a second operating system is to be started. Act 304 can include identifying that a second operating system is to be started to replace the first operating system, without performing a full hardware reboot of the computer system. For example, it may be that an operating system 102/202 is to be updated to a new version, and that a new version of the operating system is to be installed/started without going through the full boot process of the TCB 108/212. The embodiments herein are not limited to starting an updated version of a running operating system, however. For example, the currently running operating system may be restarted without an update, and older version of the running operating system may be installed (e.g., to address compatibility issues introduced in an update), or an entirely new operating system may be installed. Additionally or alternatively, it may be that the isolated operating system 203 is being updated/restarted, and/or the hypervisor 204 is being updated/restarted.

Method 300 comprises an act of 305 of configuring memory data structures. Act 305 can include, based at least on identifying that the second operating system is to be started to replace the first operating system, configuring one or more memory data structures in the protected portion of the system memory, including loading code of the second operating system in the protected portion of the system memory for starting the second operating system. For example, an operating system loader and/or a kernel may be loaded into the secured memory environment 103 of FIG. 1 (i.e., code 111), or the isolated operating system 203 of FIG. 2B (i.e., new kernel 217 and/or OS loader 219). Additionally, data structures such as memory tables/mappings that are usable to quickly resume processes after the restart can be stored in the secured memory environment 103 (i.e., data structures 110)/isolated operating system 203 (i.e., data structures 216). Any other code that may be updated can also be stored in the secured memory. For example, if the secure kernel 209 is being updated, an updated secure kernel 218 can be stored in the secured memory, or if the hypervisor 214 is being updated, an updated hypervisor can be stored in the secured memory. These memory data structures can be set up by the secured memory environment 103/isolated operating system 203, and/or can be set up by the operating system 102/202 (e.g., using the APIs 104/hypervisor 215).

Method 300 comprises an act of 306 of initiating starting of the second operating system. Act 306 can include setting a state of one or more processors to initiate execution of the code of the second operating system to start the second operating system, the second operating system using the one or more secured boot secrets obtained by the first operating system from the TCB and stored in the portion of the system memory for attesting a security status of the second operating system. For example, a program counter of a processor of the computing device 101 can be configured to begin execution of the code 111, or a program counter of a processor of the computing device 201 can be configured to begin execution of the OS loader 219, to initiate startup of the second operating system. During boot, the second operating system can utilize the secrets 109/211, such that it can attest to its security status.

As part of, or prior to, initiating starting of the second operating system, act 306 can include unprotecting the portion of the system memory, while mitigating attacks on the portion of the system memory. In reference to FIG. 1, this may include unloading portions of the operating system 102, or disabling hardware protection associated with memory implementing the secured memory environment 103. In reference to FIGS. 2A/2B, this may include stopping/unloading the kernel 206, the secure kernel 209, and/or the hypervisor 204. In order to mitigate attacks when the portion of the system memory is unprotected, various system functions that could interrupt the execution of code that is doing the transition to the second operating system and potentially change the memory can be disabled. For example, DMA, IRQs, and/or System Management Mode (SMM) (e.g., a processor operating mode in which in which normal code execution—including the operating system—is suspended, and in which other software—which is usually part of firmware or a hardware-assisted debugger—is executed with elevated privileges) may be blocked/disabled.

Accordingly, method 300 also comprises an act of 307 of protecting system memory. Act 307 can include re-protecting the portion of the system the memory, including preventing access to the portion of the system memory by the second operating system. For example, hardware protections associated with the secured memory environment 103 may be re-enabled, or the hypervisor may once again enforce isolation of memory associated with a virtual partition of the isolated operating system 203.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors and system memory, for protecting secured boot secrets while starting an operating system, the method comprising:
    identifying that a second operating system is to be started to replace a first operating system that is already running at the computer system, without performing a full reboot of the computer system; and
    based at least on identifying that the second operating system is to be started to replace the first operating system, performing at least:
        loading code of the second operating system in a protected portion of the system memory for starting the second operating system;
        unprotecting the portion of the system memory;
        setting a state of the one or more processors to initiate execution of the code of the second operating system to start the second operating system, the second operating system using one or more secured boot secrets that were stored in the portion of the system memory by the first operation system to attest a security status of the second operating system; and
        re-protecting the portion of the system the memory, including preventing access to the portion of the system memory by the second operating system.

2. The method of claim 1, wherein the one or more secured boot secrets are obtained from a trusted computing base (TCB), and are usable for attesting a security status of the first operating system.

3. The method of claim 1, wherein the first operating system is prevented from accessing the protected portion of the system memory.

4. The method of claim 1, wherein the portion of the system memory is protected using a virtualization technology that establishes a secured operating environment that is isolated from the first operating system, the virtualization technology using a hypervisor to establish a secure partition between the first operating system and the secured operating environment.

5. The method of claim 4, wherein the secured operating environment executes a secured kernel that supports at least a subset of an application programming interface (API) of a kernel of the first operating system.

6. The method of claim 4, wherein the first operating system access one or more services provided by the secured operating environment using one or more application programming interfaces (APIs) provided by the secured operating environment.

7. The method of claim 6, wherein the first operating system uses the one or more APIs to store the one or more secured boot secrets in the protected portion of the system memory.

8. The method of claim 1, further comprising configuring one or more memory data structures in the protected portion of the system memory, including identifying one or more of:
    one or more first memory pages of the system memory corresponding to at least one process executing in the first operating system; or
    one or more second memory pages of the system memory corresponding to memory of at least one virtual machine executing in the first operating system.

9. The method of claim 8, wherein initiating execution of the code of the second operating system comprises at least one of:
    allocating the one or more first memory pages to at least one process that executes in the second operating system; or
    allocating the one or more second memory pages to at least one virtual machine that executes in the second operating system.

10. The method of claim 1, further comprising configuring one or more memory data structures in the protected portion of the system memory, including configuring flags designating one or more first memory pages of the system memory as belonging to the first operating system and one or more second memory pages of the system memory as belonging to the protected portion of the system memory, and wherein re-protecting the portion of the system the memory comprises using the flags to allocate the one or more first memory pages to the second operating system and using the flags to allocate the one or more second memory pages to the protected portion of the system memory.

11. The method of claim 1, wherein loading code of the second operating system in the protected portion of the system memory comprises configuring an operating system loader of the second operating system.

12. The method of claim 1, further comprising mitigating attacks on the portion of the system memory while it is unprotected, including at least one of blocking direct memory accesses, blocking processor interrupts, or disabling a system management mode.

13. The method of claim 1, wherein at least one of the one or more secured boot secrets is obtained from a trusted platform module (TPM).

14. The method of claim 1, wherein at least one of the one or more secured boot secrets is obtained from firmware.

15. The method of claim 1, wherein the second operating system is one of a different version of the first operation system or the same version of the first operating system.

16. A computer system, comprising:
    one or more processors;
    system memory; and one or more computer-readable media having stored thereon computer-executable instructions that are executable by the one or more processors to cause the computer system to protect secured boot secrets while starting an operating system, the computer-executable instructions including instructions that are executable to cause the computer system to perform at least the following:

identify that a second operating system is to be started to replace a first operating system that is already running at the computer system, without performing a full reboot of the computer system; and based at least on identifying that the second operating system is to be started to replace the first operating system, perform at least:

loading code of the second operating system in a protected portion of the system memory for starting the second operating system;

unprotecting the portion of the system memory;

setting a state of the one or more processors to initiate execution of the code of the second operating system to start the second operating system, the second operating system using one or more secured boot secrets that were stored in the portion of the system memory by the first operation system to attest a security status of the second operating system; and re-protecting the portion of the system the memory, including preventing access to the portion of the system memory by the second operating system.

17. The computer system of claim 16, wherein the one or more secured boot secrets are obtained from a trusted computing base (TCB), and are usable for attesting a security status of the first operating system.

18. The computer system of claim 16, wherein the first operating system is prevented from accessing the protected portion of the system memory.

19. The computer system of claim 16, wherein the portion of the system memory is protected using a virtualization technology that establishes a secured operating environment that is isolated from the first operating system, the virtualization technology using a hypervisor to establish a secure partition between the first operating system and the secured operating environment.

20. The computer system of claim 16, wherein the computer-executable instructions are also executable by the one or more processors to configure one or more memory data structures in the protected portion of the system memory, including identifying one or more of:

one or more first memory pages of the system memory corresponding to at least one process executing in the first operating system; or one or more second memory pages of the system memory corresponding to memory of at least one virtual machine executing in the first operating system.

21. The computer system of claim 20, wherein initiating execution of the code of the second operating system comprises at least one of:

allocating the one or more first memory pages to at least one process that executes in the second operating system; or allocating the one or more second memory pages to at least one virtual machine that executes in the second operating system.

22. A computer program product comprising one or more hardware storage devices having stored thereon computer-executable instructions that are executable by one or more processors of a computer system to cause the computer system to protect secured boot secrets while starting an operating system, the computer-executable instructions including instructions that are executable to cause the computer system to perform at least the following:

identify that a second operating system is to be started to replace a first operating system that is already running at the computer system, without performing a full reboot of the computer system; and based at least on identifying that the second operating system is to be started to replace the first operating system, perform at least:

loading code of the second operating system in a protected portion of the system memory for starting the second operating system;

unprotecting the portion of the system memory;

setting a state of the one or more processors to initiate execution of the code of the second operating system to start the second operating system, the second operating system using one or more secured boot secrets that were stored in the portion of the system memory by the first operation system to attest a security status of the second operating system; and re-protecting the portion of the system the memory, including preventing access to the portion of the system memory by the second operating system.

* * * * *